(12) United States Patent
Thattaisundaram et al.

(10) Patent No.: US 9,360,863 B2
(45) Date of Patent: Jun. 7, 2016

(54) DATA PERTURBATION FOR WAFER INSPECTION OR METROLOGY SETUP USING A MODEL OF A DIFFERENCE

(75) Inventors: Govind Thattaisundaram, Santa Clara, CA (US); Mohan Mahadevan, Livermore, CA (US); Ajay Gupta, San Jose, CA (US); Chien-Huei Adam Chen, San Jose, CA (US); Ashok Kulkarni, San Jose, CA (US); Jason Kirkwood, Santa Clara, CA (US); Kenong Wu, Davis, CA (US); Songnian Rong, San Jose, CA (US)

(73) Assignee: KLA-Tencor Corp., Milpitas, CA (US)

( * ) Notice: Subject to any disclaimer, the term of this patent is extended or adjusted under 35 U.S.C. 154(b) by 771 days.

(21) Appl. No.: 13/258,441

(22) PCT Filed: Jun. 9, 2011

(86) PCT No.: PCT/US2011/039876
§ 371 (c)(1),
(2), (4) Date: Oct. 12, 2011

(87) PCT Pub. No.: WO2012/005863
PCT Pub. Date: Jan. 12, 2012

(65) Prior Publication Data
US 2012/0116733 A1    May 10, 2012

Related U.S. Application Data

(60) Provisional application No. 61/360,406, filed on Jun. 30, 2010.

(51) Int. Cl.
*G06F 17/50* (2006.01)
*G05B 19/418* (2006.01)

(52) U.S. Cl.
CPC .............. *G05B 19/41875* (2013.01); *G05B 2219/32182* (2013.01); *G05B 2219/45031* (2013.01)

(58) Field of Classification Search
CPC ............................. G06F 17/50; G06F 9/455
USPC ....................................................... 716/50, 132
See application file for complete search history.

(56) References Cited

U.S. PATENT DOCUMENTS

| 7,676,077 | B2 * | 3/2010 | Kulkarni et al. .............. 382/144 |
| 8,223,327 | B2 * | 7/2012 | Chen et al. .................. 356/237.2 |
| 2007/0019185 | A1 | 1/2007 | Hamamatsu et al. |
| 2008/0049219 | A1 | 2/2008 | Kim et al. |
| 2008/0067381 | A1 | 3/2008 | Hiroi et al. |

(Continued)

FOREIGN PATENT DOCUMENTS

| JP | H05-248843 | 9/1993 |
| JP | 2002-54915 | 2/2002 |
| JP | 2007-24737 | 2/2007 |

(Continued)

OTHER PUBLICATIONS

Office Action for Taiwanese Patent Application Serial No. 100121665 mailed Dec. 3, 2013.

(Continued)

*Primary Examiner* — Thuan Do
(74) *Attorney, Agent, or Firm* — Ann Marie Mewherter (57) ABSTRACT

Various embodiments for determining parameters for wafer inspection and/or metrology are provided.

39 Claims, 3 Drawing Sheets

(56) References Cited

U.S. PATENT DOCUMENTS

2009/0219520 A1    9/2009  Ko et al.
2011/0320149 A1*  12/2011  Lee et al. .................. 702/83

FOREIGN PATENT DOCUMENTS

JP      2007-329337    12/2007
KR    10-2001-0086099    9/2001

OTHER PUBLICATIONS

International Search Report and Written Opinion for PCT/US2011/039876 mailed Feb. 17, 2012.
International Preliminary Report on Patentability for PCT/US2011/039876 mailed Jan. 17, 2013.

* cited by examiner

DATA PERTURBATION FOR WAFER INSPECTION OR METROLOGY SETUP USING A MODEL OF A DIFFERENCE

CROSS-REFERENCE TO RELATED APPLICATIONS

This application is a National Stage application of International Application No. PCT/US11/39876 filed Jun. 9, 2011, which claims priority to U.S. patent application Ser. No. 61/360,406 entitled "Perturbation Modeling-Based Recipe Generation," filed Jun. 30, 2010, which is incorporated by reference as if fully set forth herein.

BACKGROUND OF THE INVENTION

1. Field of the Invention

The present invention generally relates to data perturbation for wafer inspection or metrology setup.

2. Description of the Related Art

The following description and examples are not admitted to be prior art by virtue of their inclusion in this section.

Inspection processes are used at various steps during a semiconductor manufacturing process to detect defects on wafers to promote higher yield in the manufacturing process and thus higher profits. Inspection has always been an important part of fabricating semiconductor devices. However, as the dimensions of semiconductor devices decrease, inspection becomes even more important to the successful manufacture of acceptable semiconductor devices because smaller defects can cause the devices to fail.

Currently, methods for generating recipes that can pass tool matching specifications are empirical. For example, a recipe may be created on the first tool ("Tool 1") and then tried on the second tool ("Tool 2"). If the recipe does not pass the tool matching specifications on Tool 2, it is modified and brought over to Tool 1 and tested. If the modified recipe does not pass tool matching specifications, then this process is performed back and forth from one tool to the other iteratively until the recipe settings lead to tool matching results. This process gets even more complicated when three or more tools are involved. As such, setting up matching recipes in this manner can take a significant amount of wafer time, tool time, and engineering time.

Accordingly, it would be advantageous to develop methods and systems for determining one or more parameters for wafer inspection and/or metrology that do not have one or more disadvantages of the above-described methods.

SUMMARY OF THE INVENTION

The following description of various embodiments is not to be construed in any way as limiting the subject matter of the appended claims.

One embodiment relates to a computer-implemented method for determining one or more parameters for wafer processing. The method includes generating a model of a difference between performance of one or more first wafer scans and performance of one or more second wafer scans. These scans can take place on the same inspection or metrology tool or on different inspection or metrology tools. In addition, the one or more scans may include scans performed with similar or dissimilar (inspection or metrology) modes and may include any combination of multiple scans. Furthermore, the scans may be inspection scans or metrology scans. The method also includes generating results for a wafer using the one or more first wafer scans. The results may include inspection results or non-inspection measurement results (e.g., metrology results). In addition, the method includes generating perturbed results for the wafer using the results and the model. The perturbed results approximate the results that would be generated for the wafer by the one or more second wafer scans. The method further includes determining one or more parameters for the wafer processing based on the perturbed results. The wafer processing includes performing the one or more second wafer scans. Steps of the method are performed by a computer system.

Another embodiment relates to a computer-implemented method for generating results that can be used to determine one or more parameters for wafer processing. The method includes generating a model of a difference between performance of one or more first wafer scans and performance of one or more second wafer scans. The method also includes generating results for a wafer using the one or more first wafer scans. In addition, the method includes generating perturbed results for the wafer using the results and the model. The perturbed results approximate results that would be generated for the wafer by the one or more second wafer scans. The perturbed results can be used to determine one or more parameters for the wafer processing. The wafer processing includes performing the one or more second wafer scans. Steps of the method are performed by a computer system.

An additional embodiment relates to a computer-implemented method for determining one or more parameters for wafer processing. The method includes generating results for a wafer using one or more first wafer scans. The method also includes generating perturbed results for the wafer using the results and a model of a difference between performance of the one or more first wafer scans and performance of one or more second wafer scans. The perturbed results approximate results that would be generated for the wafer by the one or more second wafer scans. In addition, the method includes determining one or more parameters for the wafer processing based on the perturbed results. The wafer processing includes performing the one or more second wafer scans. Steps of the method are performed by a computer system.

Each of the steps of each of the methods described above may be further performed as described herein. In addition, each of the methods described above may include any other step(s) of any other method(s) described herein. Furthermore, each of the methods described above may be performed by any of the systems described herein.

BRIEF DESCRIPTION OF THE DRAWINGS

Further advantages of the present invention will become apparent to those skilled in the art with the benefit of the following detailed description of the preferred embodiments and upon reference to the accompanying drawings in which.

While the invention is susceptible to various modifications and alternative forms, specific embodiments thereof are shown by way of example in the drawings and are herein described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

In general, the embodiments described herein are related to perturbation modeling-based stable recipe generation. One embodiment relates to a computer-implemented method for determining one or more parameters for wafer processing (e.g., wafer inspection and/or wafer metrology). As will be described further herein, the method may include building a model and then perturbing the data (or performing other modifications to the data) using the model to create a wafer inspection or metrology recipe, which has three broad types of applications. For example, in one embodiment, determining the one or more parameters is performed as described further herein to match the performance of one or more second wafer scans to the performance of one or more first wafer scans.

In one embodiment, the one or more first and the one or more second wafer scans are performed by different tools. For example, the method may be used to determine one or more parameters (or "recipe settings") that can pass tool matching specifications. In this manner, one broad type of application of the embodiments described herein is tool-to-tool matching in which recipes are created that can pass tool matching specifications. One example of tool matching specifications is that the count and location of D defects captured by two tools over N repeats with a self capture rate ("self caprate") of C % must match to within M %. The values of C, N, and M can depend on the layer of the wafer and the nature of the tool.

In another embodiment, the one or more first and the one or more second wafer scans are performed by the same tool. For example, the methods described herein can be used to generate one or more parameters (or "recipe settings") that can pass self caprate or scan matching specifications. In this manner, the embodiments described herein can be used for another broad type of application that includes self caprate recipe generation or scan-to-scan matching in which recipes are created that can pass the self caprate specifications.

In an additional embodiment, the one or more first and the one or more second wafer scans are performed after a predetermined interval. For example, the third broad type of application is adapting recipes to process changes in time, which is described further herein.

In this manner, the one or more first and the one or more second wafer scans may be performed by the same tool, different tools, or at different times. As such, the three broad applications include: 1) tool-to-tool matching (or inter-tool scan matching); 2) scan-to-scan matching (or intra-tool scan matching); and 3) tool-to-tool or scan-to-scan matching to account for changes over time. While a user is setting up a recipe, the user can decide if he or she wants to set up a recipe with a certain self caprate or a recipe that passes tool matching specifications.

Although some embodiments are described herein with respect to one application (e.g., tool-to-tool matching), the three applications are similar in how they use this method. Therefore, although the embodiments may be described with respect to one application (e.g., tool-to-tool matching), one of ordinary skill in the art will understand how to use the embodiments for another application (e.g., scan-to-scan matching).

The term "one or more parameters" or "recipe settings" generally refers to all settings (including iDO™ settings) in a recipe that are adjustable (e.g., all settings that the user is allowed to adjust). iDO™ is an inline Defect Organizer™ binning solution that is commercially available from KLA-Tencor, Milpitas, Calif. A "recipe" can be generally defined as a set of instructions for carrying out a process such as inspection and metrology.

In one embodiment, the one or more parameters include one or more parameters used to perform the one or more second wafer scans. For example, the one or more parameters may include one or more parameters of an illumination subsystem, a detection subsystem, a scanning subsystem, or some combination thereof of a tool that are used to perform the one or more second wafer scans. In this manner, the one or more parameters may include one or more results acquisition parameters. The one or more parameters of the illumination subsystem may include, for example, angle(s) of illumination, wavelength(s) of illumination, polarization(s) of illumination, spot size, aperture(s) included in the illumination subsystem, other optical component(s) included in the illumination subsystem, and combinations thereof. The one or more parameters of the light detection subsystem may include, for example, angle(s) of collection, wavelength(s) of detection, polarization(s) of detection, pixel size, aperture(s) included in the detection subsystem, other optical component(s) included in the detection subsystem, and combinations thereof. Similar parameter(s) can be determined for non-light based systems (e.g., electron beam systems).

In another embodiment, the one or more parameters include one or more parameters used for processing results generated by the one or more second wafer scans. For example, the one or more parameters may include one or more parameters used for processing results generated by a light detection subsystem used to perform the one or more second wafer scans. In one such example, the results generated by the light detection subsystem may include images or image data, and the one or more parameters may include one or more parameters used to filter, align, etc. the images or image data. In another example, the results may include signals, and the one or more parameters may include one or more parameters used for filtering, normalizing, calibrating, etc. the signals. The one or more parameters used for processing the results may be determined separately for different areas on the wafer. For example, results generated in one area of the wafer may be processed using one or more first parameters, and results generated in another area of the wafer may be processed using one or more second parameters, at least some of which may be different than the first parameter(s). The one or more parameters may also or alternatively include a defect detection sensitivity, which may be defined by one or more parameters (e.g., a threshold) of a defect detection algorithm and/or method. In addition, the one or more parameters may include different detection sensitivities for different areas of the wafer (e.g., higher sensitivity for critical or less noisy areas and lower sensitivity for non-critical or more noisy areas).

The method includes generating a model of a difference between performance of one or more first wafer scans and performance of one or more second wafer scans. Therefore, the embodiments described herein may include modeling of results across scans, tools, or other hardware, which can be used as described further herein to generate matched parameters from results generated by only one tool, scan, or hardware. For example, the relative behavior of the optics and other hardware between tools or scans does not change substantially from one wafer to another. Therefore, this information can be used to model the behavior of the image/defect data between the tools or scans. For example, for tool-to-tool matching, the method may include creating a model that captures the tool-to-tool variability.

In one embodiment, the difference in the performances includes a difference in an attribute of defects on a wafer on which the one or more first and the one or more second scans were performed to generate results used to generate the model. In other words, the model is generated using real results of actual scans performed on a wafer. Using real results to build the model provides confidence in the performance of the model. Results from multiple tools may be used to create a model for each tool to one other tool (a "golden" or reference tool). However, the embodiments described herein can also be used to study two or more tools in a relative manner instead of to a "golden tool." The real results may be generated by actually performing the one or more first and the one or more second wafer scans on a wafer. However, the real results may be acquired without actually performing the one or more first and the one or more second wafer scans on a wafer. For example, the real results may be acquired by the embodiments described herein from one or more storage media in which the real results have been stored.

The attribute of the defects may include an attribute of the defects determined using a defect detection algorithm. In addition, the attribute of the defects may include an attribute of the defects that is responsive to a characteristic (e.g., intensity) of light from the defects detected during the scans or even a relative response between a group of pixels. For example, the attribute may include magnitude, MDAT offset, MDAT gray level (reference gray level), and energy. MDAT is a defect detection algorithm used by some inspection tools that are commercially available from KLA-Tencor. The attribute of the defect can be as general as possible. It could include non-intensity type attributes such as defect location, defect size and any other computed or measured quantity. There is no limitation to the nature of the attribute in the method.

Some specific embodiments of generating the model are described further herein. However, the models described herein are not limited to any particular type of model. In theory, the model can be as simple as that described herein or as sophisticated as required to accurately model variability of attributes across two scans or sets of scans.

In one embodiment, generating the model includes identifying defects on a wafer that are common to the one or more first and the one or more second wafer scans. For example, let us consider a single attribute of the defects. We can then model the variability of this attribute for the common defects as described further herein. The common defects may be identified in any suitable manner. For example, common defects may be identified as two defects that are within a specified distance of each other. Identifying the common defects may be performed using simple defect location matching algorithms.

Figure 1:
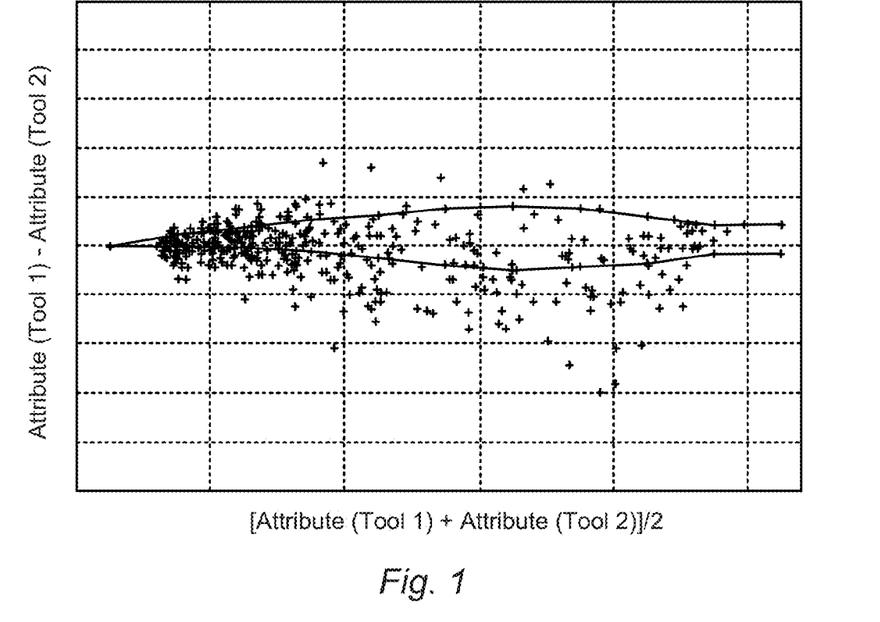
FIG. 1 is an example of a plot of the difference between an attribute of defects determined using a first wafer scan and the attribute determined using a second wafer scan versus the average of the attribute determined using the first wafer scan and the attribute determined using the second wafer scan.

In an embodiment, generating the model also includes plotting the difference between an attribute of the defects determined using the one or more first wafer scans and the attribute determined using the one or more second wafer scans versus the average of the attribute determined using the one or more first wafer scans and the attribute determined using the one or more second wafer scans. In other words, generating the model may include plotting [Attribute (Tool 1)−Attribute (Tool 2)] on the y axis versus [Attribute (Tool 1)+Attribute (Tool 2)]/2 on the x axis. One example of such a plot is shown in FIG. 1. In this plot, each data point corresponds to one common defect.

In some embodiments, generating the model also includes splitting the defects into bins corresponding to different values of the average, and each of the bins includes the same number of defects as each of the other bins. For example, the defects shown in the plot of FIG. 1 can be split into N bins of equal size. In one such example, the first bin may correspond to values of the average from 0 to 50, the second bin may correspond to values of the average from 51 to 100, the third bin may correspond to values of the average from 101 to 150, and so on.

Figure 2:
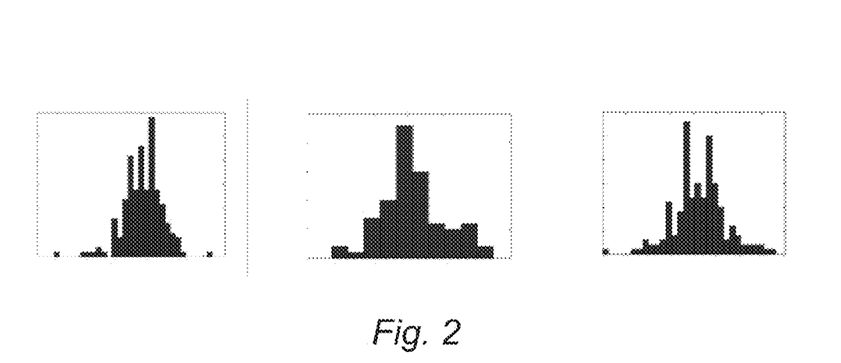
FIG. 2 includes examples of histograms of populations within bins into which defects are split to generate a model as described herein.

In a further embodiment, generating the model includes determining, for each of t bins, the mean and sigma of the distribution of the attribute of the defects in each of the bins. For example, for each bin, the mean and sigma for the points in that bin can be determined. In this manner, the variability of the attributes of the defects in each of the bins can be examined. For example, as shown in FIG. 1, the top curve is the variance value within each bin, and the bottom curve is the mean value within each bin. Therefore, this figure shows the variability of an attribute and the model generation strategy. The variance drops at the higher values due to saturation. During the investigation, the distribution has been identified as Gaussian by using the Kolmogorov-Smirnov test (With an optimal set of parameters), which is known in the art, or any other test for a Gaussian distribution. For example, FIG. 2 shows histograms for three different populations of defects within three different bins. The Kolmogorov-Smirnov test confirms the Gaussian nature of the distributions. However, the attribute used to generate the model may or may not follow the Gaussian distribution. For example, if the log-normal distribution is a better model, then it can be used in place of the Gaussian distribution. Distributions other than Gaussian simply change how the model is constructed but the whole procedure is followed as described herein. In that case, there is an additional requirement to model the data using the right distribution.

When more than one attribute is modeled, then the correlation between the attributes should be taken into account for model generation. For example, let us assume three attributes that follow the Gaussian or any other distribution are modeled. If all of the attributes are correlated, then sampling for the perturbed results must be performed from the same random Gaussian or other distribution. If there is poor correlation, then the sampling must be performed from independent random Gaussian or other distributions.

In one embodiment, prior to generating the model, the method includes altering one or more parameters of one or more tools used to perform the one or more first and the one or more second wafer scans such that the one or more first and the one or more second wafer scans are matched to each other before the one or more first and the one or more second wafer scans are used to generate results that will be used to generate the model. For example, a perturbation approach may not be useful if the variability between attributes is relatively large. In other words, for the applications described herein, it only makes sense to generate models describing attribute variability after the tools or scans used to generate the results for model generation are matched. Thus, it is assumed that the two tools or scans are matched and then the model is constructed with matched data. This matching of the tools or scans prior to model generation ensures that the variability is not relatively large. For example, once two tools or scans are "matched," there is some guarantee that variations in attributes from the two "matched" tools or scans are within some specific bounds. If the tools or scans are not matched prior to generation of results used for model generation, then the model can be constructed but may capture extremely undesirable variations in hardware and calibrations. The tools or scans that are used to generate the results for model generation may be matched using any suitable matching procedure, which matches the hardware and the calibrations between the tools or scans. If the tools or scans are matched using some other method and/or system prior to model generation, then the methods described herein may not include such tool matching. Safeguards can also be built into the model to minimize the risk of excessive adaptability.

In another embodiment, generating the model may include determining one or more scale factors per tool. (The details of the particular model determine what other parameters we use to achieve the goal of intra-tool matchability.) For example, the intra-tool variability (i.e., scan-to-scan variability of one tool) may be modeled as described herein. Modeling the scan-to-scan variability removes the dependence on optics state, pixel size, and wafer. In this manner, modeling the data from one tool to another from the scan-to-scan variability is a decent measure of the hardware, optics, and other residual variations. For example, experiments were performed that show that different wafers, different optics modes, and different stage speeds produce nearly identical scale factors. As such, a scan-to-scan model may be scaled appropriately to represent the inter-tool variability. In this manner, one or more scale factors may be determined per tool.

The method also includes generating results for a wafer using the one or more first wafer scans. For example, once the model or models are generated as described above, then real data from only the reference wafer scan may be acquired for any given wafer and used with the model or models to perform additional steps of the method described herein (e.g., to create a matching recipe). In this manner, once a given tool has been used to generate a model described herein, that tool is no longer needed to generate recipes that are matched to the performance of another tool. Of course, if a recipe is being generated to match performance of one or more second scans performed using one tool to the performance of one or more first scans performed using the same tool, then results generated using that tool may be used as described further herein to generate the recipe for those one or more second scans.

The method includes generating perturbed results for the wafer using the results and the model. In other words, the results of the one or more first scans is used as input to the methods, and the output of the model is the perturbed results. In this manner, results of the one or more first wafer scans (e.g., results such as incoming data to algorithms and iDO or other recipe settings) will be perturbed according to the model created earlier for that particular condition. In one embodiment, generating the perturbed results includes drawing a point for a bin from a random distribution having the mean and sigma determined for a corresponding bin in the model. For example, a perturbed data set may be generated by drawing a point from a random Gaussian distribution with the mean and sigma derived from the right bin in the model. In this manner, the perturbed results will have a histogram that is substantially matched to a histogram of the original results. As such, for scan or tool matching, by matching the attribute histograms, attributes of the defects detected by the matched scans or tools can be expected to be matched too.

Figure 3:
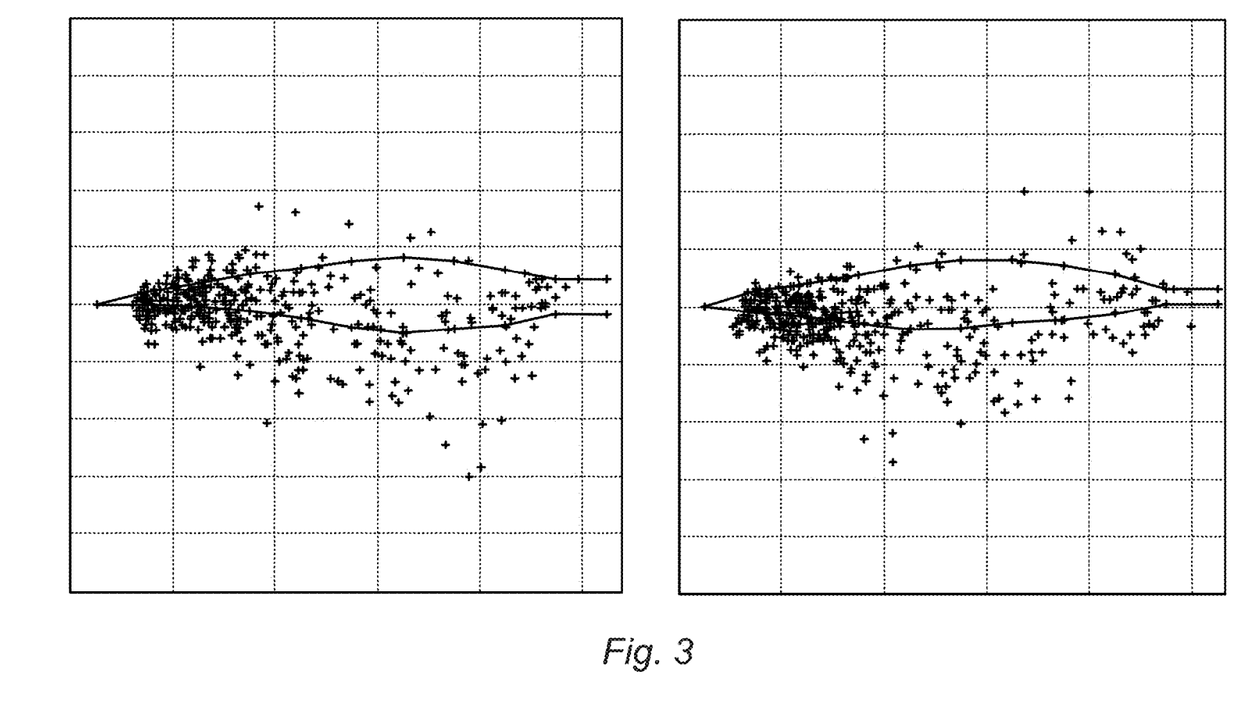
FIG. 3 includes examples of plots illustrating results for a wafer generated using a wafer scan and perturbed results generated as described herein.

The perturbed results approximate results that would be generated for the wafer by the one or more second wafer scans. For example, using the model described herein, the results such as image/defect data can be perturbed to approximate, simulate, or mimic the results from the one or more second tools or scans. In other words, the perturbed results will not be exactly the same as the results that would be generated by the one or more second wafer scans; however, the perturbed results will be a reasonable approximation of the results that would be generated by the one or more second wafer scans. In one such example, FIG. 3 illustrates how well the perturbed results approximate, simulate, or mimic the results that would be generated for the wafer by the one or more second wafer scans. In particular, the plot on the left hand side of FIG. 3 is the variability of the real results from which the model is created and the plot on the right hand side of FIG. 3 is the variability of the perturbed results. As shown in FIG. 3, it is not possible to distinguish which results are from the real tool and which results are from the model and its corresponding perturbation, which confirms the plausibility of the model.

The method further includes determining one or more parameters for the wafer processing based on the perturbed results. For example, a recipe can be setup using the perturbed results, possibly in combination with the original results from the tool or scan. In one such example, the recipe may be created using the set of perturbed results, possibly in combination with N number of sets of similarly perturbed results and/or the original results. This recipe then has the ability to meet the tool or scan matching specifications even though it was developed on a single tool or using a single scan. For example, when the recipe is set up using the perturbed results described herein, the recipe will naturally work on the second tool or scan with similar sensitivity as the first tool or scan. Enough perturbed results and possibly actual results are preferably used to capture the variability in the results for matching recipe generation.

Determining one or more parameters for wafer processing may include selecting or determining a value for at least one parameter of a wafer processing recipe. The term "parameter" is used herein to refer to all of the variables that are used to setup an inspection and/or metrology tool such as wavelength(s), pixel, care area, speed, illumination and collection apertures, etc. For example, the parameter(s) for wafer processing may include a parameter of a tool used to acquire results responsive to tight from the wafer and/or a parameter of the tool used to process the results. In this manner, the parameter(s) may include results acquisition parameter(s) and/or results processing parameter(s). The wafer processing may be dark field (DF) inspection, bright field (BF) inspection, electron beam (e-beam) inspection, DF and BF inspection, or multi-mode inspections (involving data from one or more platforms simultaneously), or from any other metrology or inspection tool that requires tool/inspection matching to be satisfied. The one or more parameters may be determined in the method automatically or without user input. However, the one or more parameters may also or alternatively be determined based on the perturbed results with input from a user. For example, a user may be provided feedback on the performance of one or more determined parameters in real time as he or she changes the recipe settings.

The wafer processing includes performing the one or more second wafer scans. For example, as described further herein, the one or more parameters may include one or more parameters used to perform the one or more second wafer scans, one or more parameters used to process results generated by the one or more second wafer scans, and combinations thereof.

In one embodiment, the method is performed at predetermined intervals, and the wafer processing is performed using the one or more parameters determined after the most recent interval if the results or the perturbed results generated after the last two intervals are different from each other by more than a predetermined value. For example, the method can be used to mimic lot-to-lot variations and to dynamically adjust recipes as the process changes in time. In one such example, the embodiments can be used to study recipe performance and defect attribute(s) over a specified period (e.g., N lots). If the performance is steady in terms of nuisance rates and defect attribute ranges, then no recipe changes are required. If the performance is not steady, then a model for the defect attribute variability within a class can be automatically created and used to tune the recipe settings. This recipe performance can be automatically checked once in N lots. In this manner, the embodiments described herein can be used to adjust recipes so that they remain stable in a dynamic production process. If the model is recomputed every M lots, this calculated model can act as an standalone indicator of process change. This can be a powerful new statistical standalone indicator of significant process change.

In another embodiment, the difference between the performances includes a difference between an attribute of a class of defects that is common to the one or more first and the one or more second wafer scans. For example, adapting recipes to process changes over time may be performed in a manner similar to that described further herein with some qualitative differences. In particular, the first and second wafer scans will be performed on different wafers and therefore defects that are common to both scans will not be available for generating a model. However, attribute variations for a class or classes of defects can be modeled. Such an approach is based on the assumption that over a data sample of N lots, there is a certain distribution of the class or classes of defects. The range of variation for this use case may be substantially different than the range of variation of the attribute determined for model generation for tool-to-tool and scan-to-scan matching.

In one embodiment, the one or more first wafer scans are performed by a first tool, the one or more second wafer scans are performed by a second tool, and determining the one or more parameters is performed without using the second tool. In another embodiment, the method does not include iteratively performing two or more steps of the method. For example, the embodiments described herein provide a concrete method for generating "matchable" recipes on one tool with prior information from a second tool in a single iteration. Therefore, the embodiments described herein save time and effort and bring a systematic approach to creating recipes that can satisfy scan or tool matching specifications. In particular, the embodiments described herein provide a concrete and quick way to generate recipes that can pass self-caprate and tool matching specifications without going back and forth between multiple tools, multiple times.

The embodiments described herein provide a number of advantages over other methods for determining parameters for wafer processing such as wafer inspection and metrology. For example, the embodiments described herein provide ease of use and relatively quick self-caprate or tool matching results. In particular, current methods of achieving self-caprate or tool matching results are empirical and require the user to go through a series of steps. Performing the steps may take a relatively long time (e.g., a day or more) depending on the complexity of the situation, number of tools, and tool usage at the user's site. However, the embodiments described herein allow for a quick turnaround in creating a recipe that can satisfy self-caprate and tool matching specifications without having to go back and forth multiple times between multiple tools.

In this manner, the embodiments described herein require less tool time, less engineering time, less scanning electron microscopy (SEM) review effort and less wafer time to create matching recipes. For example, instead of running production lots on tools, currently, the user has to use the tools to setup tool matching recipes, which increases the cost of ownership of the tools. Depending on how many recipes a given user writes, this can be a significant cost. However, in the embodiments described further herein, multiple tools are not required to be used to generate matching recipes. In particular, as described herein, the embodiments eliminate the need to get results from every tool and every layer for which the user needs to create matching recipes. Therefore, the embodiments described herein can save significant tool time that can be used for other purposes (e.g., actual inspection). In addition, the embodiments described herein speed up the time to create a matching recipe while also providing a systematic method to create the recipe. The embodiments described herein also require less engineer time to create tool matching recipes. For example, normally, an engineer writes recipes. However, if the engineer can produce a tool matching recipe out of the box on one tool, it will save a good deal of his time. This translates to reduction of direct costs in terms of the engineer's time and indirect costs through reduction of the engineer's frustration. Furthermore, iDO matching can require a substantial amount of SEM review in current methodologies in which SEM classification and review are required from multiple tools. However, the embodiments described herein cut down on this time dramatically thereby saving significant SEM review time.

In another embodiment, the method includes performing the one or more first and the one or more second wafer scans on one layer of a wafer to generate results that are used to generate the model, and the wafer processing will be performed on other layers of the wafer or other layers of other wafers. For example, currently, wafer processing setup for every layer requires a visit to every tool and may require SEM review of the lots. However, according to the embodiments described herein, after a model is created for each tool to a "golden" tool, a matching recipe can be built without going to every tool. In particular, the models described herein may be layer-independent as they are hardware and optics dependent. The layer may include a mask layer or a process layer such as an active layer, poly layer, contact layer, metal layer, etc. A layer may be formed on the wafer using any suitable wafer fabrication process such as lithography, etch, deposition, chemical-mechanical polishing (CMP), or any other process that can alter the structure of the wafer.

Another embodiment relates to a computer-implemented method for generating results that can be used to determine one or more parameters for wafer processing. The method includes generating a model of a difference between performance of one or more first wafer scans and performance of one or more second wafer scans, which may be performed as described further herein. The method also includes generating results for a wafer using the one or more first wafer scans, which may be performed as described further herein. In addition, the method includes generating perturbed results for the wafer using the results and the model, which may be performed as described further herein. The perturbed results approximate results that would be generated for the wafer by the one or more second wafer scans. The perturbed results approximate the results as described further herein. The perturbed results can be used as described further herein to determine one or more parameters for the wafer processing. The wafer processing includes performing the one or more second wafer scans.

An additional embodiment relates to a computer-implemented method for determining one or more parameters for wafer processing. The method includes generating results for a wafer using one or more first wafer scans, which may be performed as described further herein. The method also includes generating perturbed results for the wafer using the results and a model of a difference between performance of the one or more first wafer scans and performance of one or more second wafer scans, which may be performed as described further herein. The model may be generated as described herein using another computer-implemented method. The perturbed results approximate results that would be generated for the wafer by the one or more second wafer scans. The perturbed results approximate the results as described further herein. In addition, the method includes determining one or more parameters for the wafer processing based on the perturbed results, which may be performed as described further herein. The wafer processing includes performing the one or more second wafer scans.

All of the methods described herein may include storing results of one or more steps of the method in a non-transitory, computer-readable storage medium. The results may include any of the results described herein and may be stored in any manner known in the art. The storage medium may include any storage medium described herein or any other suitable storage medium known in the art. After the results have been stored, the results can be accessed in the storage medium and used by any of the method or system embodiments described herein, formatted for display to a user, used by another software module, method, or system, etc. For example, after the method determines the one or more parameters for the wafer processing, the method may include storing a recipe for the wafer processing that includes the one or more parameters in a storage medium such that a system can use the recipe for processing such as inspection and/or metrology.

Each of the steps of each of the methods may be performed by a computer system. The computer system may be configured as described herein. Each of the embodiments of the method may include any other step(s) of any other method(s) described herein. In addition, each of the embodiments of the method may be performed by any of the systems described herein.

Figure 4:
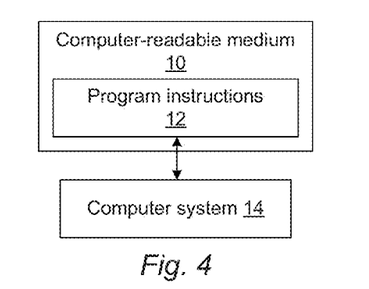
FIG. 4 is a block diagram illustrating one embodiment of a non-transitory computer-readable medium.

Another embodiment relates to a non-transitory computer-readable medium storing program instructions therein for causing a computer system to perform one or more of the computer-implemented methods described herein. One embodiment of such a computer-readable medium is shown in FIG. 4. In particular, computer-readable medium 10 contains program instructions 12 stored therein for causing computer system 14 to perform one or more of the computer-implemented methods described herein.

Program instructions 12 implementing methods such as those described herein may be stored on computer-readable medium 10. The computer-readable medium may be a non-transitory computer-readable storage medium such as a read-only memory, a random access memory, a magnetic or optical disk, a magnetic tape, or any other suitable computer-readable medium known in the art.

The program instructions may be implemented in any of various ways, including procedure-based techniques, component-based techniques, and/or object-oriented techniques, among others. For example, the program instructions may be implemented using ActiveX controls, C++ objects, Java-Beans, Microsoft Foundation Classes ("MFC"), or other technologies or methodologies, as desired.

Computer system 14 may take various forms, including a personal computer system, mainframe computer system, workstation, image computer, parallel processor, or any other device known in the art. In general, the term "computer system" may be broadly defined to encompass any device having one or more processors, which executes instructions from a memory medium.

Figure 5:
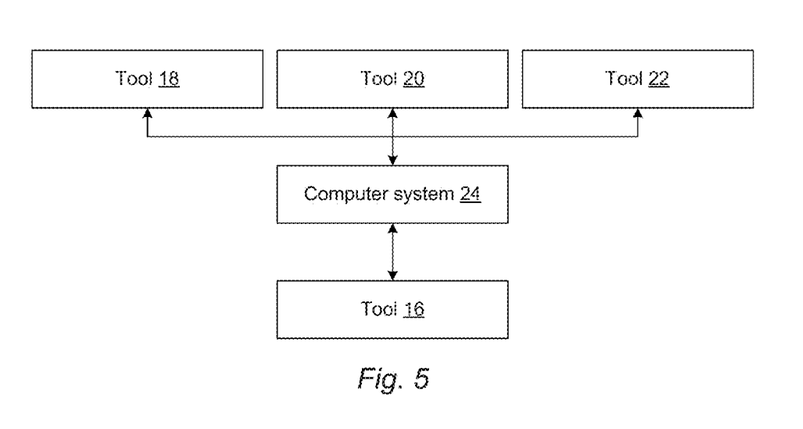
FIG. 5 is a block diagram illustrating one embodiment of a system that can be used to perform one or more computer-implemented methods described herein.

FIG. 5 illustrates one embodiment of a system configured to perform one or more of the computer-implemented methods described herein. As shown in FIG. 5, the system includes a number of tools 16, 18, 20, and 22. Tools 16, 18, 20, and 22 may include any commercially available wafer inspection and/or metrology tools. One of the tools (e.g., tool 16) may be used to generate results that are used to generate perturbed results for one of the other tools (e.g., tools 18, 20, and 22). For example, the system may be configured to generate results for a wafer using one or more first wafer scans that are performed using tool 16.

Computer system 24, which may be further configured as described herein, may be coupled to each of the tools in any suitable manner such that the computer system can send and receive data to and from each of the tools. For example, computer system 24 may receive the results generated using the one or more first wafer scans from tool 16.

The computer system may be configured to generate perturbed results for the wafer using the results generated by tool 16 and a model such as that described herein. The perturbed results approximate the results that would be generated for the wafer by one or more second wafer scans performed by one of the other tools.

Computer system 24 may also be configured to determine one or more parameters for wafer processing based on the perturbed results, which may be performed as described further herein. In this manner, the results generated by tool 16 can be used to generate a wafer processing recipe for one of the other tools. In addition, the results generated by tool 16 can be used to generate a wafer processing recipe for one of the other tools without using those other tools, which is advantageous as described further herein. Therefore, tool 16 may be dedicated for wafer processing recipe setup although this tool may also be used for actual wafer processing when it is not being used for wafer processing setup.

Computer system 24 may be configured as a stand-alone system that does not form part of a process, inspection, metrology, review, or other tool. Alternatively, computer system 2.4 may form part of a wafer inspection system, metrology system, defect review system, analysis system, or another tool.

Further modifications and alternative embodiments of various aspects of the invention may be apparent to those skilled in the art in view of this description. For example, methods for determining one or more parameters for wafer inspection and/or metrology are provided. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A computer-implemented method for determining one or more parameters for wafer processing, comprising:
   generating a model of a difference between performance of one or more first wafer scans and performance of one or more second wafer scans;
   generating results for a wafer using the one or more first wafer scans;
   generating perturbed results for the wafer using the results and the model, wherein the perturbed results simulate results that would be generated for the wafer by the one or more second wafer scans; and
   determining one or more parameters for the wafer processing based on the perturbed results, wherein the wafer processing comprises performing the one or more second wafer scans, and wherein steps of the method are performed by a computer system; and
   wherein the method is performed at predetermined intervals, and wherein the wafer processing is performed using the one or more parameters determined after the most recent interval if the results or the perturbed results generated after the last two intervals is different from each other by more than a predetermined value.

2. The method of claim 1, wherein said determining is performed to match the performance of the one or more second wafer scans to the performance of the one or more first wafer scans.

3. The method of claim 1, wherein the one or more first and the one or more second wafer scans are performed by different tools.

4. The method of claim 1, wherein the one or more first and the one or more second wafer scans are performed by the same tool.

5. The method of claim 1, wherein the method does not comprise iteratively performing two or more steps of the method.

6. The method of claim 1, wherein the one or more first wafer scans are performed by a first tool, wherein the one or more second wafer scans are performed by a second tool, and wherein said determining is performed without using the second tool.

7. The method of claim 1, wherein the difference in the performances comprises a difference in an attribute of defects on a wafer on which the one or more first and the one or more second wafer scans were performed to generate results used to generate the model.

8. The method of claim 1, wherein generating the model comprises identifying defects on a wafer that are common to the one or more first and the one or more second wafer scans.

9. The method of claim 8, wherein generating the model further comprises plotting the difference between an attribute of the defects determined using the one or more first wafer scans and the attribute determined using the one or more second wafer scans versus the average of the attribute determined using the one or more first wafer scans and the attribute determined using the one or more second wafer scans.

10. The method of claim 9, wherein generating the model further comprises splitting the defects into bins corresponding to different values of the average, and wherein each of the bins comprises the same number of defects as each of the other bins.

11. The method of claim 10, wherein generating the model further comprises determining, for each of the bins, the mean and sigma of the distribution of the attribute of the defects in each of the bins.

12. The method of claim 11, wherein generating the perturbed results comprises drawing a point for a bin from a random distribution having the mean and sigma determined for a corresponding bin in the model.

13. The method of claim 1, further comprising prior to generating the model, altering one or more parameters of one or more tools used to perform the one or more first and the one or more second wafer scans such that the one or more first and the one or more second wafer scans are matched to each other before the one or more first and the one or more second wafer scans are used to generate results that will be used to generate the model.

14. The method of claim 1, wherein the difference between the performances comprises a difference between an attribute of a class of defects that is common to the one or more first and the one or more second wafer scans.

15. The method of claim 1, further comprising performing the one or more first and the one or more second wafer scans on one layer of a wafer to generate results that are used to generate the model, wherein the wafer processing will be performed on other layers of the wafer or other layers of other wafers.

16. The method of claim 1, wherein the one or more parameters comprise one or more parameters used to perform the second wafer scan.

17. The method of claim 1, wherein the one or more parameters comprise one or more parameters used for processing results generated by the second wafer scan.

18. The method of claim 1, wherein the wafer processing comprises inspection or metrology.

19. A computer-implemented method for generating results that can be used to determine one or more parameters for wafer processing, comprising:
   generating a model of a difference between performance of one or more first wafer scans and performance of one or more second wafer scans;
   generating results for a wafer using the one or more first wafer scans; and
   generating perturbed results for the wafer using the results and the model, wherein the perturbed results simulate results that would be generated for the wafer by the one or more second wafer scans, wherein the perturbed results can be used to determine one or more parameters for the wafer processing, wherein the wafer processing comprises performing the one or more second wafer scans, and wherein steps of the method are performed by a computer system; and
   wherein the method is performed at predetermined intervals, and wherein the wafer processing is performed using the one or more parameters determined after the most recent interval if the results or the perturbed results generated after the last two intervals is different from each other by more than a predetermined value.

20. A computer-implemented method for determining one or more parameters for wafer processing, comprising:
   generating results for a wafer using one or more first wafer scans;
   generating perturbed results for the wafer using the results and a model of a difference between performance of the one or more first wafer scans and performance of one or more second wafer scans, wherein the perturbed results simulate results that would be generated for the wafer by the one or more second wafer scans; and determining one or more parameters for the wafer processing based on the perturbed results, wherein the wafer processing comprises performing the one or more second wafer scans, and wherein steps of the method are performed by a computer system; and wherein the method is performed at predetermined intervals, and wherein the wafer processing is performed using the one or more parameters determined after the most recent interval if the results or the perturbed results generated after the last two intervals is different from each other by more than a predetermined value.

21. A system configured to determine one or more parameters for wafer processing, comprising:

one or more tools configured to generate results for a wafer using one or more scans; and a computer system configured for:

generating a model of a difference between performance of the one or more first wafer scans and performance of one or more second wafer scans;

generating perturbed results for the wafer using the results and the model, wherein the perturbed results simulate results that would be generated for the wafer by the one or more second wafer scans performed by the one or more tools; and determining one or more parameters for the wafer processing based on the perturbed results, wherein the wafer processing comprises performing the one or more second wafer scans with the one or more tools; and wherein the one or more tools are further configured to generate the results at predetermined intervals, wherein the computer system is further configured for performing the generating the perturbed results step and the determining the one or more parameters step at the predetermined intervals, and wherein the wafer processing is performed using the one or more parameters determined after the most recent interval if the results or the perturbed results generated after the last two intervals is different from each other by more than a predetermined value.

22. The system of claim 21, wherein the one or more tools comprise one or more wafer inspection tools, one or more wafer metrology tools, or one or more wafer inspection tools and one or more wafer metrology tools.

23. The system of claim 21, wherein a first of the one or more tools is that generates the results using the one or more first wafer scans is different than a second of the one or more tools that performs the one or more second wafer scans.

24. The system of claim 21, wherein the one or more tools comprise only one tool that performs the one or more first and the one or more second wafer scans.

25. The system of claim 21, wherein said determining is performed to match the performance of the one or more second wafer scans to the performance of the one or more first wafer scans.

26. The system of claim 21, wherein the computer system is not configured for iteratively performing two or more of the generating the model step, the generating the perturbed results step, and the determining the one or more parameters step.

27. The system of claim 21 wherein a first of the one or more tools that generates the results using the one or more first wafer scans is different than a second of the one or more tools that performs the one or more second wafer scans, and wherein said determining is performed without using the second of the one or more tools.

28. The system of claim 21, wherein the difference in the performances comprises a difference in an attribute of defects on a wafer on which the one or more first and the one or more second wafer scans were performed to generate results used to generate the model.

29. The system of claim 21, wherein generating the model comprises identifying defects on a wafer that are common to the one or more first and the one or more second wafer scans.

30. The system of claim 29, wherein generating the model further comprises plotting the difference between an attribute of the defects determined using the one or more first wafer scans and the attribute determined using the one or more second wafer scans versus the average of the attribute determined using the one or more first wafer scans and the attribute determined using the one or more second wafer scans.

31. The system of claim 30, wherein generating the model further comprises splitting the defects into bins corresponding to different values of the average, and wherein each of the bins comprises the same number of defects as each of the other bins.

32. The system of claim 31, wherein generating the model further comprises determining, for each of the bins, the mean and sigma of the distribution of the attribute of the defects in each of the bins.

33. The system of claim 32, wherein generating the perturbed results comprises drawing a point for a bin from a random distribution having the mean and sigma determined for a corresponding bin in the model.

34. The system of claim 21, wherein the computer system is further configured for, prior to generating the model, altering one or more parameters of the one or more tools used to perform the one or more first and the one or more second wafer scans such that the one or more first and the one or more second wafer scans are matched to each other before the one or more first and the one or more second wafer scans are used to generate results that will be used to generate the model.

35. The system of claim 21, wherein the difference between the performances comprises a difference between an attribute of a class of defects that is common the one or more first and the one or more second wafer scans.

36. The system of claim 21, wherein the one or more tools are further configured to generate the results by performing the one or more first and the one or more second wafer scans on one layer of a wafer to generate results that are used to generate the model, and wherein the wafer processing will be performed on other layers of the wafer or other layers of other wafers.

37. The system of claim 21, wherein the one or more parameters comprise one or more parameters used to perform the second wafer scan.

38. The system of claim 21, wherein the one or more parameters comprise one or more parameters used for processing results generated by the second wafer scan.

39. The system of claim 21, wherein the wafer processing comprises inspection or metrology.

* * * * *